Oct. 7, 1969  M. C. DARLING  3,470,792
MAXIMUM PRESSURE CONTROL APPARATUS FOR HYDRAULIC ACTUATORS
Filed Aug. 2, 1967  3 Sheets-Sheet 1

INVENTOR.
MARVIN C. DARLING
BY
Hubert Miller
ATTORNEYS

Oct. 7, 1969  M. C. DARLING  3,470,792
MAXIMUM PRESSURE CONTROL APPARATUS FOR HYDRAULIC ACTUATORS
Filed Aug. 2, 1967  3 Sheets-Sheet 2

INVENTOR.
MARVIN C. DARLING
BY Hubert Miller

INVENTOR.
MARVIN C. DARLING

United States Patent Office 3,470,792
Patented Oct. 7, 1969

3,470,792
MAXIMUM PRESSURE CONTROL APPARATUS FOR HYDRAULIC ACTUATORS
Marvin C. Darling, Burton, Kans., assignor to The Cessna Aircraft Company, Wichita, Kans., a corporation of Kansas
Filed Aug. 2, 1967, Ser. No. 657,900
Int. Cl. F15b 15/22, 11/10, 13/042
U.S. Cl. 91—396                                    9 Claims

ABSTRACT OF THE DISCLOSURE

A pressure actuated valving system which is responsive to a rise in pressure in the discharging chamber of a hydraulic actuator above a predetermined desired maximum to cut off fluid pressure from the source entering the expanding chamber of the actuator, thereby relieving the discharge chamber of the continuing rise in pressure which would otherwise accompany the continued flow of pressure fluid into the expanding or intake chamber. Should speed of the piston exceed a predetermined desired rate it throttles the discharge to govern the piston speed. It shunts a required volume of discharging fluid to the expanding or intake chamber to prevent cavitation.

---

More particularly, the invention is intended for use on linear or rotary hydraulic motors which make use of some type of progressively restrictive discharge orifice at the end of the stroke. The improved apparatus provides a cushioned stop without the damaging high pressures in the exhausting chamber of the motor. The snubbing condition is created by dropping the pressure in the expanding chamber to zero upon sensing an increased pressure in the discharging chamber by reason of the restrictive orificing. The effect of the condition created is a reverse pressure drop across the piston of the motor which assists rather than detracts in bringing the piston to a static condition.

Fluid motors in the prior art have relied on progressive orificing in the discharge port as the sole means of cushioning. With the current economic demands of industry for faster moving actuators with comparable or greater torque involved, the existing methods of cushioning have become inadequate. The need for high-speed operation of hydraulic cylinders has presented serious problems due to the effect of inertia. Inertia, we may remember, is the condition which finds an object at rest resisting being started and an object in motion resisting being stopped.

Hydraulically operated devices are often heavy objects such as loaded crane booms and other material lifting applications. It is important that these work functions be performed quickly, but a sudden stoppage of the motor at the end of the stroke or completion of a work cycle can create dangerous shock loads for the hydraulic system and produce tremendous stresses and wear on the actuator components and related mechanical linkages.

It is, therefore, the principal objective of the present invention to provide a new and improved cushioning means to bring the piston or vane of a hydraulic motor to a smooth stop at the end of its stroke, or in any intermediate position, with a minimal discharge chamber pressure.

Another object of the invention is to provide energy absorbing apparatus for stopping an inertial loaded piston by reducing the pressure in the expanding chamber during the cushioning portion of the stroke.

An additional object of the invention is to provide energy absorbing apparatus for stopping an inertia loaded piston by relieving pressure in the discharge chamber to an exhaust line when critical pressures are reached.

Another object of the invention is to provide a source of low pressure fluid in the inlet chamber to prevent the possibility of cavitation when the inlet pressure is shut off, or there is a loss of system pressure.

Still another object of the invention is to provide a cushioning means which vents excessive pressure from the discharging chamber by way of a high pressure relief valve to the inlet chamber.

Further objects and advantages of the invention will be in part apparent and in part pointed out specifically hereinafter in connection with the description of the drawings that follows and in which.

Figure 1:
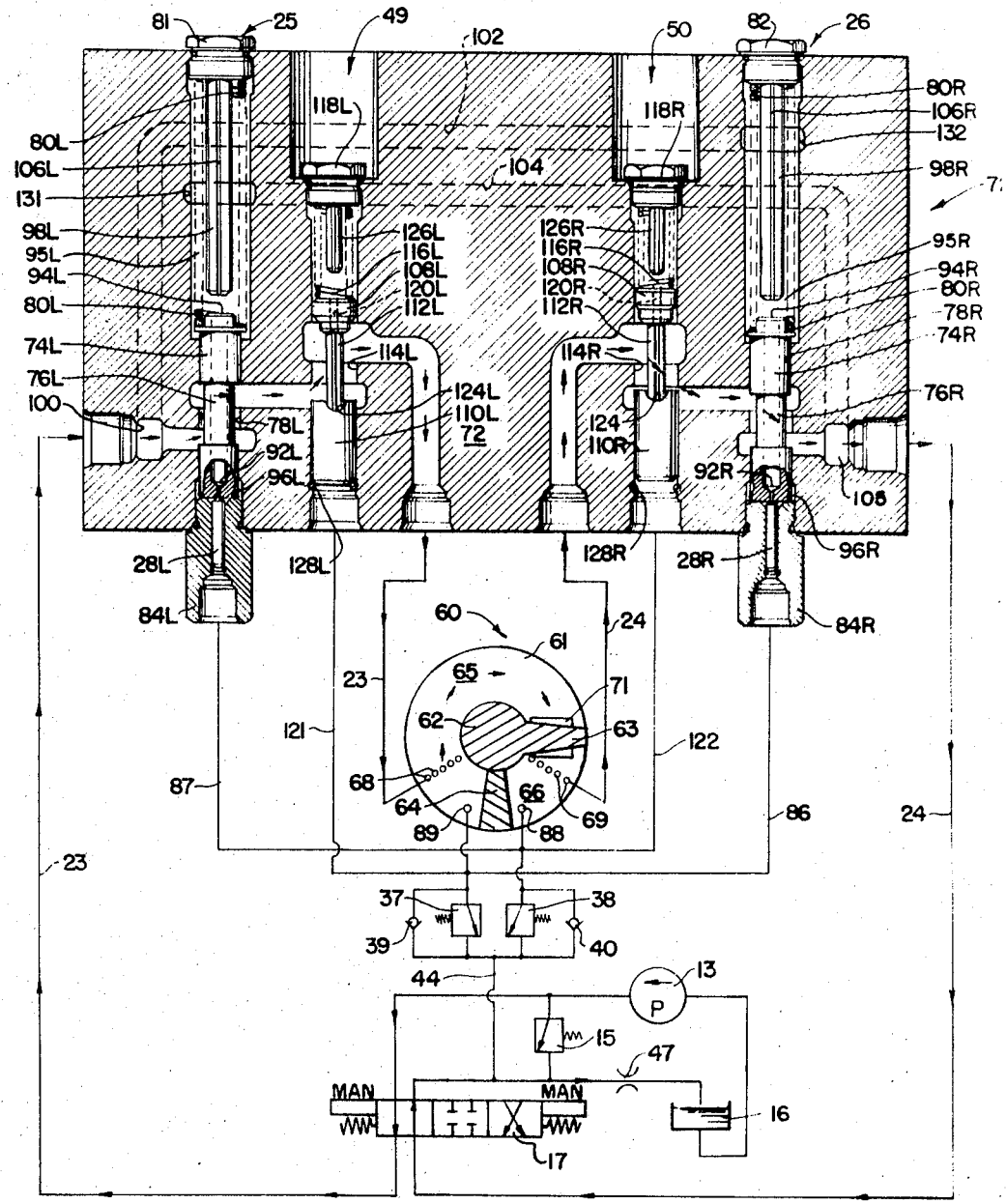
FIG. 1 is a combined diagrammatic and pictorial view of a rotary hydraulic cylinder, and its associated apparatus, all of which is shown partially cut away to illustrate the path of fluid flow.
Figure 2:
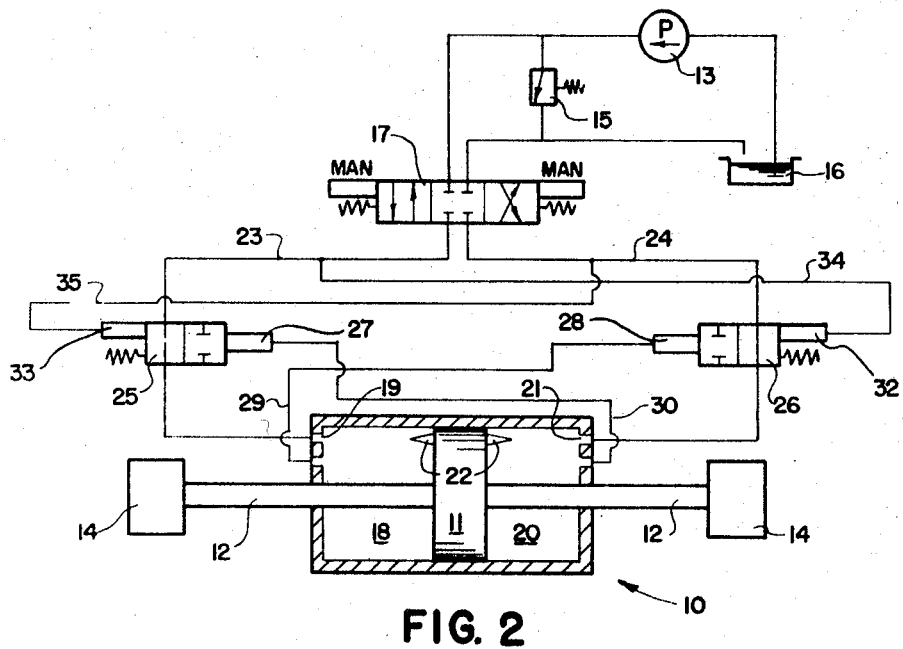
FIG. 2 is a diagrammatic view of a double acting lineal cylinder and automatic cushioning mechanism.

Referring now to the drawings for a detailed description of the invention and more specifically to FIG. 2 which illustrates the basic cushioning circuit in diagrammatic form with a double acting lineal cylinder generally identified by reference numeral 10. Although a lineal cylinder is illustrated, other types of actuators, such as the rotary actuator (FIG. 1), single acting lineal and other actuators may be used with the present invention. The cylinder 10 is shown containing a piston 11 having a pair of piston rods 12 extending outwardly from both ends thereof and connected mechanically to a pair of work loads 14 shown in symbolic form. The cylinder derives its hydraulic energy from a constant volume pump 13 or the like which bypasses fluid when necessary through relief valve 15 to reservoir 16. The direction of movement of the cylinder 10 is controlled by a common directional control valve 17 which is manually operated. For example, if the valve 17 is moved to the right, fluid enters inlet chamber 18 through inlet port 19 while fluid is exhausted from chamber 20 as the piston 11 moves to the right. Movement of the valve 17 to the left causes the reverse movement of the piston, while movement of the valve to the center position, as seen in the drawing, locks the piston 11 in a static position.

Axially aligned with inlet port 19 and discharge port 21 are a pair of tapered pins 22 integrally mounted one on each side of piston 11. As the piston 11 approaches the end of its stroke to the right the end of pin 22 enters discharge port 21 and because of its tapered design, will gradually meter the trapped oil flow through an orifice of gradually decreasing size until the opening is completely closed. Metered orifices of this type are common in the art and the configurations shown in the drawings are merely symbolic for purposes of simplicity. Other types of variable orifices may be used, some of which will be later described.

As orifice 21 begins to close, the pressure in the discharge chamber 20 increases as it absorbs the energy of the dynamic condition. If the work loads 14 are substantial, the inertia effect of the moving loads 14 combined with the inlet pressure will produce momentary pressures in the discharge chamber that can seriously damage the cylinder 10. In prior art types of variable orifices, the cushioning is produced solely by restricting the discharge flow as just mentioned.

Positioned in the inlet line 23 and discharge line 24 are a pair of pilot operated shut-off valves 25 and 26 respectively. Both valves are spring biased to the open position by springs as seen in FIGURE 2. Valve 25 is actuated by a pilot cylinder 27 to the closed position through a sensing line 30 which is ported to chamber 20. Pilot cylinder 33 assisted by the spring will override pilot cylinder 27. Valves 25 and 26 will be further described in detail in conjunction with FIGURE 1.

OPERATION—FIGURE 2 EMBODIMENT

When the manual control valve 17 is moved to the right (straight through position) fluid is introduced into chamber 18, valve 25 being spring biased open. Valve 26 which is located in the discharge line 24 is also spring biased open since pilot cylinders 28 and 32 counteract each other. As the piston 11 approaches the right end of the cylinder 10, pin 22 begins to orifice the discharge fluid through port 21. The combined effect of deceleration of the work load 14 and the inlet pressure in chamber 18 causes the pressure in the discharge chamber to sharply rise. When the pressure reaches a specified value, pilot cylinder 27 closes shut-off valve 25 through sensing line 30. With the inlet line 23 closed the pressure in the inlet chamber 18 immediately decreases. The increasing pressure in the discharge chamber 20 combined with the lack of pressure in the inlet chamber 18 causes a substantial reverse pressure drop across piston 11. This pressure drop decelerates the piston to a smooth stop without the high discharge pressures experienced in the prior art devices. When the system becomes static and the pressure in the discharge chamber recedes, spring biased valve 25 returns to the open position. By moving control valve 17 to the left (criss-cross position), fluid is introduced into chamber 20 through line 24. The piston 11 moves to the left and the cushioning circuit operates in the same manner as just described with valve 26 rather than 25 performing the shut-off function.

FIGURE 3

This figure is similar to FIGURE 2 with the addition of an anti-cavitation circuit. By the very nature of the invention, shutting off flow into a chamber which is increasing in volume creates the possibility of a cavitation condition. For that reason, pressure relief valves 37 and 38, check valves 39 and 40 and low pressure return lines 41 and 42 were included in the circuit. If, at any time, excessive pressure is built up in chamber 20, relief valve 38 opens and fluid is vented through lines 42, 45, check valve 39, line 41 and enters the inlet chamber 18. Excessive pressure in chamber 20 can thus be relieved by fluid flow into chamber 18 to prevent cavitation. Excess pressure in chamber 18 is relieved in a similar manner.

Line 44 acts as another anti-cavitation feature to that just described. Line 44 connects line 45 into low pressure return line 46, which dumps fluid into reservoir 16. A small pressure of approximately 50 p.s.i. is maintained in line 46 and is schematically represented by flow restriction 47. If pressure becomes low in chamber 18 or 20, low pressure fluid will flow from line 44 across the appropriate check valve 39 or 40 into chamber 18 or 20 to prevent cavitation.

OPERATION—FIGURE 3 EMBODIMENT

If a condition arises under which there is a loss of pressure from pump 13, while control valve 17 remains open, a cavitation situation can occur by reason of the inertia effect of the load 14 on the piston 11. However, the small back pressure maintained in line 44 is sufficient to supply adequate fluid to avoid such a problem.

In another situation, if control valve 17 is suddenly moved from the right (straight through) to the middle position (no flow), with piston 11 at mid-stroke, the inertia of load 14 will cause the piston to continue movement to the right. A cavitation situation will arise in chamber 18 and critical high pressures will develop in chamber 20. Relief valve 38 will open allowing fluid to flow into chamber 18, thereby relieving the threat of cavitation until the inertia effect of the load is overcome. Under the conditions just mentioned, the relief valve 38 performs a cushioning function at mid-stroke. Relief valve 38 can also act as a cushioning means at the end of the stroke in conjunction with the cushioning apparatus described in FIGURE 2.

FIGURE 4

Figure 3:
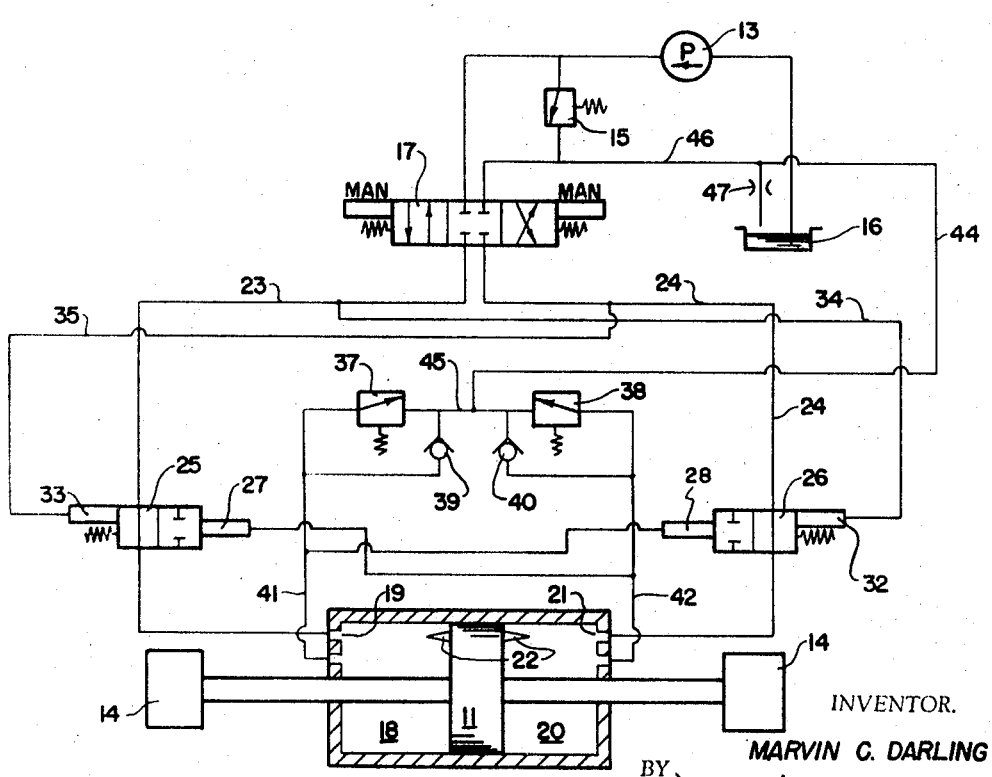
FIG. 3 is a diagrammatic view as shown in FIG. 2 further including an anti-cavitation circuit.

This figure is similar to FIGURE 3 with the addition of piston velocity governor circuit. The hydraulic cylinder 10 and all of its related structure operates in the same manner as described in FIGURES 2 and 3 with the exception of variable flow valves 49 and 50, which are positioned in discharge lines 23 and 24 respectively. The variable orificing of these identical valves is represented schematically as a four position valve which varies the discharge flow from the cylinder 10 through lines 23 or 24 depending upon the direction of movement of the piston 11. Valve 49 is shown as having four positions from fully closed to the spring biased fully open position (as drawn). Valve 49 is operated by means of a pair of hydraulic pilot cylinders 51 and 55 which, in the absence of a pressure differential, is biased fully open by spring 53. the pilot cylinder 55 senses the pressure in line 23 by way of fluid passage 57. Pilot cylinder 51, which counteracts cylinder 55, senses the pressure in chamber 18 by way of conduit 41. Assuming the piston 11 is being moved to the left, as the pressure in discharge chamber 18 exceeds the pressure in line 23, there is a pressure drop across discharge port 19, valve 49 is actuated to a restricted flow position by pilot cylinder 51 over-riding cylinder 55 and spring 53. The greater the pressure differential between chamber 18 and line 23 the greater will be the flow impedance caused by valve 49. When the pressure in chamber 18 and line 23 is substantially equal, valve 49 will remain in the fully open position as drawn.

OPERATION—FIGURE 4 EMBODIMENT

As piston 11 moves to the right, assuming that a substantial external load is applied in the same direction, the moving piston will attempt to speed up. The increased velocity condition will cause the pressure in chamber 20 to increase because a greater volume of fluid is being forced through discharge port 21. The increased pressure causes port 21 to act as an orifice which creates a pressure drop thereacross. The pressure drop is sensed by pilot cylinder 52, causing valve 50 to restrict the flow in the discharge line 24 until the velocity of the piston 11 is returned to a normal operating speed.

With the very large external loads 14 being moved, it is very dangerous to permit the piston 11 and its load 14 to attain a greater velocity and greater kinetic energy than the cushioning stop mechanism can absorb. Any large amount of unabsorbed kinetic energy at the end of the stroke will cause damaging impact to the cylinder 10 and its related structure.

FIGURE 1

Figure 4:
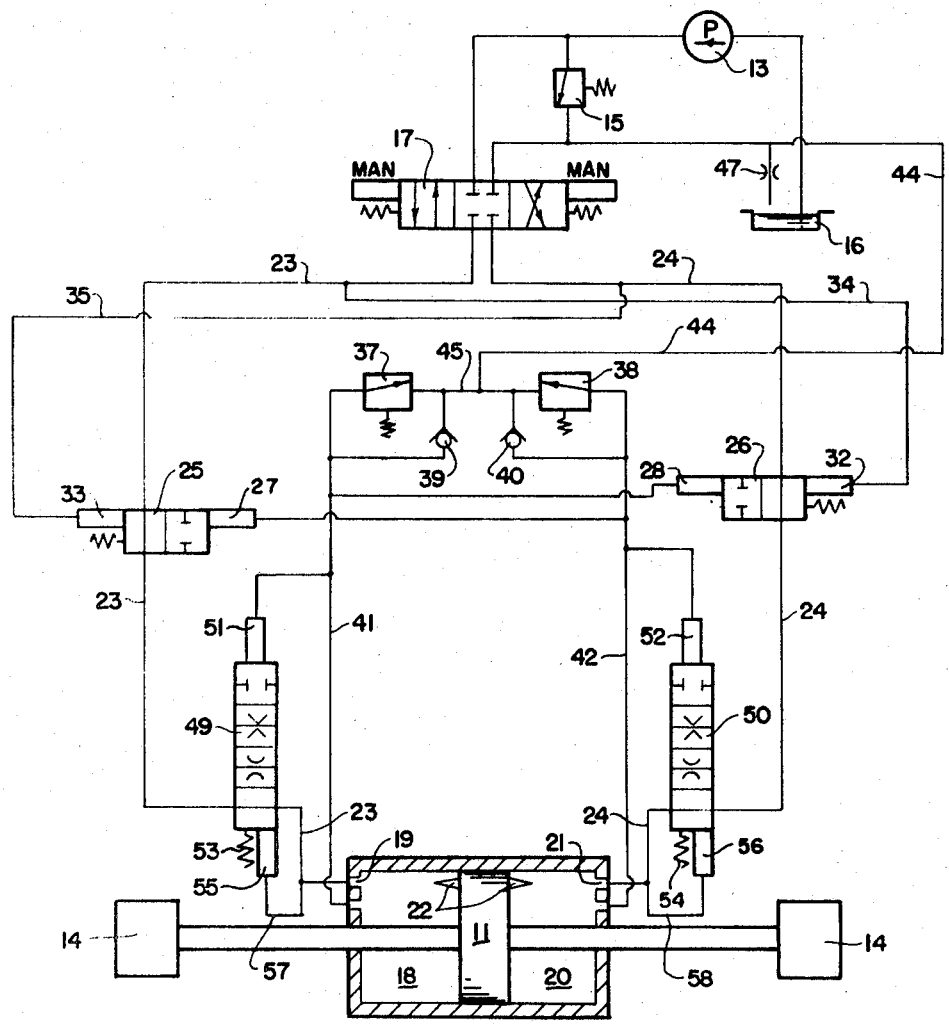
FIG. 4 is a diagrammatic view as shown in FIG. 3 further including a piston velocity governor circuit.

In this figure, the cushion stop and piston velocity governor apparatus is illustrated with a rotary fluid motor 60. The various automatic valve mechanisms previously described in FIGURES 2, 3, and 4 in schematic form are illustrated in their physical forms in this figure. As previously mentioned, any type of lineal or rotary fluid motor can be used with the novel cushion stop and piston velocity governor apparatus of the present invention.

The rotary cylinder 60 is schematically shown having its various ports entering through the end plate 61 of the cylinder. Integral with the load carrying shaft 62 is the movable vane 63 which maintains sealing contact with the inner surface of the cylinder 60 during rotation. The fixed vane 64 integrally attached to the cylinder 60 also maintains sealing contact with the surface of the rotating shaft 62, thereby providing inlet and discharge chambers 65 and 66 depending upon the direction of movement of vane 63. The flow into the cylinder 60 is from line 23 through a series of small orifices 68 into inlet chamber 65 which causes vane 63 to move in a clockwise direction. As the vane 63 approaches the end of the stroke, as shown in the drawing, the discharge orifices 69 are progressively closed by a spring biased plate 71 attached to and moving with the vane 63. The plate 71, although attached to the vane 63, is free to move up off of the surface of the end plate 61. When the flow is reversed, the light spring holding the plate 71 in contact with the end plate is lifted upward to permit full flow through the orifices 69. The directional control valve 17, pump 13, bypass valve 15, and pressure relief valves 37 and 38 are all similar in operation to those shown in FIGURES 2, 3, and 4; therefore, they will not be described in detail. Pressure sensing ports 89 and 88 located in chambers 65 and 66 are connected to pilot pistons 28R and 28L through lines 86 and 87.

Shut-off valves 25 and 26 along with piston velocity control valves 49 and 50 are located in valve body 72. All of the last mentioned valves are essentially similar to those shown schematically in FIGURE 4 with the same reference numerals. Although the valve body 72 is shown separate from the cylinder 60 for purposes of illustration and simplicity, they can be incorporated together as a unitary structure.

Shut-off valve 26, which is identical to valve 25, consists of a spring loaded piston 74 having a center portion 76 of lesser diameter. Piston 74 is biased downward in bore 78 by spring 80. The threaded spring retainer plug 82 can be adjusted up or down to vary the compression of spring 80. The downward travel of piston 74 is limited by fitting 84 located at the lower end of bore 78. When a high pressure is experienced in chamber 66, it is sensed through port 88 and line 87. The increased pressure causes pilot piston 28L to overcome the resistance of spring 80, thus moving piston 74L upward to interrupt flow through bore 78L. Through the center of piston 74 is a passage 94 which permits fluid to flow back and forth between the chambers 95 and 96 immediately above and below piston 74. Passage 92 serves a dual function, in that it first acts as a dash pot to dampen the upward or downward movement of piston 74. Passage 92L also permits fluid to drain from chamber 96 which has leaked past pilot piston 28L from sensing line 87. If this leakage could not be drained the hydraulic pressure on both ends of pilot piston 28 would remain the same and the piston could not move. The upper end of pilot piston 28 contains a series of radial grooves not seen in the drawing, which allow flow through passages 92 and 94 to continue when pilot piston 28 is in contact with the end of passage 92. The upper travel of piston 74 is limited by stem 98 which extends downward from plug 82. Groove 106 prevents the end of stem 98 from blocking the flow through passage 94L. The upper end of piston 74 is exposed to the pressure in chamber 95 and acts as a pilot piston in assisting spring 80 in maintaining valve 26 open. Chamber 95 senses the pressure in the inlet line 23 through port 100, sensing line 102 and port 132.

Velocity control valve 50 acts as a variable orifice in the discharge line 24 and is responsive to a pressure drop across openings 69. The control valve 50 comprises a first piston 108 integrally connected to a second piston 110 by a slotted pin 112. The piston assembly is spring biased downward by spring 116 in bore 114. The compression in the spring 116 can also be varied by adjustment of retainer plug 118. Extending downwardly from plug 118 is a slotted stem 126 which limits the upward travel of piston 108. Normally valve 50 is spring biased to the fully open position as illustrated by the position of identical valve 49. The upper end of piston 108 senses the pressure in line 24 by way of fluid passage 120 through slotted pin 112. The lower end of piston 110 senses the pressure in chamber 66 through port 88 and line 122. When the system is static or under normal flow conditions the pressures in line 24 and chamber 66 are equal and therefore equal forces are exerted on opposing ends of pistons 108 and 110 respectively. With the pressures being equal, the spring 116 maintains the valve in the fully open position. When the pressure in chamber 66 exceeds that in line 24 the pressure against piston 110 overrides spring 116 and moves the piston 110 upward. As the upper end of piston 110 approaches and enters bore 114 the fluid flow is gradually restricted. Laterally located across the top of piston 110 is a slotted opening 124 which decreases in cross sectional area as piston 110 moves upward in bore 114. As piston 110 begins to restrict the flow a back pressure is created upstream from piston 110. The increased back pressure decreases the pressure differential acting on valve 50 until the valve eventually stabilizes for the present flow conditions of cylinder 60.

OPERATION—FIGURE 1 EMBODIMENT

The work load, which could be a crane boom, for example, is attached to the rotating shaft 62 of the motor 60.

To actuate the rotary motor 60 in a clockwise direction, the control valve 17 is moved to the right (straight through) position, as seen in FIGURE 1. Working pressure from pump 13 is thus introduced into inlet chamber 65 through line 23 and valves 25 and 49. The flow of hydraulic fluid illustrated by arrows in the drawing enters openings 68 and forces the vane to rotate in a clockwise direction.

In an over-speed condition the external work load attempts to rotate shaft 62 in the same direction it is being moved by the working pressure of the system. The increased velocity of vane 63 will cause a greater volume of fluid to be forced through discharge ports 69. The discharge ports 69 will act as a restricting orifice creating a pressure drop thereacross. The increased pressure in chamber 66 is sensed by the lower face of piston 110R through port 88. As the pressure in chamber 66 exceeds the pressure in return line 24 by a predetermined differential valve 50 is activated and restricts the flow through line 24. The greater the pressure differential between chamber 66 and line 24, the more restrictive will be the position of valve 50. Under normal flow conditions when there is no pressure drop across discharge ports 69, valve 50 remains in the fully open position. In the drawing valve 50 is shown partially closed whereas valve 49 is illustrated fully open.

If the motor 60 were operating in a counter-clockwise over-speed condition, velocity control valve 49 would meter the discharge flow through line 23 in the same manner as just described by valve 50.

As the vane 63 approaches the end of its clockwise stroke as shown in the drawing, the discharge orifices 69 are progressively blocked off by spring biased plate 71. The pressure rise in chamber 66 caused by the decreasing area of the discharge ports 69 is sensed by shut-off valve 25 through port 88 and line 87. The increased pressure causes pilot piston 28L to move piston 74L upward into a position which fully blocks bore 78L. An overspeed condition at mid-stroke can also actuate valve 25. To close valve 25 the force exerted by pilot piston 28 must be greater than the combined forces of spring 80 and the hydraulic pressure exerted in chamber 95L. Chamber 95L senses the pressure in return line 24 through line 104 and ports 131 and 105. As piston 74L moves upward, its speed is governed by the fluid flowing through passage 92L.

As shut-off valve 25 closes, the pressure in chamber 65 drops as the chamber enlarges, thus creating a greater reverse pressure differential across the vane 63 to assist in decelerating the vane. During the clockwise stroke of vane 63, shut-off valve 26 remains in the fully open position by reason of spring 80R and the pressure in chamber 95R being exerted against the upper end of piston 74R. Chamber 95 senses the pressure in inlet line 23 through port 100, line 102, and port 132.

If the external inertia load on shaft 62 is greater than the cushioning stop apparatus just mentioned can accommodate, pressure in chamber 66 is relieved through relief valve 38. The relieved fluid can flow back into chamber 65 through check valve 39 or into the reservoir return line 44 as previously described in detail in FIGURE 3.

When directional valve 17 is moved to the left (criss-cross) position, the flow is reversed and fluid enters chamber 66 causing vane 63 to rotate in a counter-clockwise direction. When an overspeed situation is experienced, valve 49 meters the discharge flow as just described by similar valve 50. During the cushioning portion of the stroke, shut-off valve 26 is actuated in the same manner as valve 25, also described above.

Having described the invention with sufficient clarity to enable those familiar with the art to construct and use it, I claim:

1. Pressure governing apparatus for a hydraulic actuator experiencing heavy inertia loads, which actuator includes a housing defining a working chamber having a differential pressure movable barrier traversing said chamber and dividing it into two variable volume chambers each of which alternately acts as an intake chamber having a port therein connected by an intake line to a source of hydraulic pressure, while the other acts as a discharge chamber having a port therein connected to a discharge or exhaust line, and which actuator also includes variable orificing means cooperating with the discharge port for cushioning the end of the stroke of the movable barrier, the pressure governing apparatus comprising:
   shut-off valve means positioned in said inlet line, normally spring biased to an open position; valve operator means responsive to a predetermined pressure in the discharge chamber which is greater than the operating pressure in said chamber operatively connected to the shut-off valve means, which latter, upon actuation overrides the valve spring, closes the valve and maintains it closed so long as said pressure exists, and thereby blocks flow from the pressure source into the inlet chamber, which effectively reduces the maximum pressure experienced in the discharge chamber during any portion of the stroke;
   passage means connecting the discharge chamber with the intake chamber;
   a check valve positioned in said passage permitting flow only from the discharge chamber to the intake chamber; and
   a high pressure relief valve positioned in said passage permitting flow in the passage only when the pressure in the discharge chamber exceeds a predetermined pressure which is greater than the pressure required to actuate the shut-off valve.

2. A pressure governing apparatus as set forth in claim 1 including:
   a low pressure fluid source;
   a second passage connecting the lower pressure fluid source to the first passage at a point between the check valve and relief valve downstream from the relief valve.

3. A pressure governing apparatus as set forth in claim 1 including:
   a piston velocity control means comprising:
   a variable flow valve positioned in the discharge line normally spring biased in the fully open position;
   a second valve operator means responsive to a predetermined pressure differential between the discharge chamber and the exhaust line operatively connected to the variable flow valve which upon actuation overrides the valve spring and moves the valve into a restrictive position; the greater pressure differential, the greater is the flow restrictive position of the valve whereby the speed of the movable barrier is governed throughout its stroke of travel.

4. A pressure governing apparatus as set forth in claim 1 including:
   a piston velocity control means comprising:
   a second passage traversing the discharge line;
   a slidable piston means positioned in said second passage capable of variably restricting the cross sectional area of the discharge line in response to a predetermined pressure drop across the discharge port, the greater the pressure drop, the greater the restrictive position of the piston;
   a first pressure sensing line connecting the discharge chamber to said second passage at a point below said piston whereby the pressure in the discharge chamber is exerted against one end of said piston causing the piston to restrict the flow;
   a second pressure sensing line connecting the discharge line pressure with the opposing end of said piston thereby resisting the force imposed on said piston through the first sensing line; and
   spring biasing means assisting the hydraulic pressure exerted through the second sensing line in maintaining the piston in the fully open position.

5. A pressure governing apparatus as set forth in claim 1 wherein the valve operator means includes:
   a pair of hydraulic pilot pistons operatively attached to the shut-off valve means in opposing manner;
   a first sensing conduit connecting the discharge chamber to the first pilot piston whereby an increased pressure in the discharge chamber causes the shut-off valve to move to the closed position; and
   a second sensing conduit connecting the exhaust line pressure with the second pilot piston, whereby the shut-off valve is urged to the open position with the assistance of the valve spring.

6. A pressure governing apparatus as set forth in claim 1 wherein:
   the actuator is of a rotary type having a cylindrical working chamber limited by planar end walls;
   the movable barrier is a rotary piston journaled in the end walls having at least one vane in slidable sealing engagement with the cylindrical wall of the working chamber and the end walls thereof; and
   at least one fixed vane abutment radially positioned within the working chamber and fixed from movement with respect to said working chamber having slidable sealing engagement with said rotary piston thereby providing two variable volume chambers separated by said fixed and movable vanes.

7. A pressure governing apparatus set forth in claim 6, wherein the variable orificing means includes:
   a series of discharge ports in one of the end walls located in close proximity to the fixed vane and positioned to be progressively closed by portions of the movable vane acting as a slidable valve face as the vane approaches the end of the stroke.

8. A pressure governing apparatus as set forth in claim 1, wherein:
   the actuator is a lineal type cylinder having a cylindrical working chamber with planar end walls;
   the movable barrier is a piston normally disposed in the working chamber for longitudinal movement therein.

9. A pressure governing apparatus as set forth in claim 8, wherein the variable orificing means includes: a tapered metering pin attached to the piston in axial alignment with the discharge port whereby as the end of the pin enters the port, the cross sectional area of the port is gradually decreased to zero as the piston reaches the end of the stroke.

References Cited

UNITED STATES PATENTS

| 1,964,196 | 6/1934 | Cuttot | 91—448 |
| 2,066,109 | 12/1936 | Hirvonen | 91—448 |
| 2,464,283 | 3/1949 | Adams | 91—421 |
| 2,741,895 | 4/1956 | Horvath | 91—436 |
| 2,902,009 | 9/1959 | Ludwig et al. | 91—408 |
| 3,038,448 | 6/1962 | Corwin | 91—394 |
| 3,207,048 | 9/1965 | Ramsey | 91—408 |

FOREIGN PATENTS 786,189   6/1935   France.

PAUL E. MASLOUSKY, Primary Examiner

U.S. Cl. X.R.

91—408, 421, 437, 441, 447